United States Patent [19]

Krashkevich et al.

[11] Patent Number: 4,932,752
[45] Date of Patent: Jun. 12, 1990

[54] FIBER OPTIC CORE GLASS COMPOSITIONS HAVING A HIGH REFRACTIVE INDEX

[75] Inventors: David G. Krashkevich, Dallas; Monika J. Liepmann, Laflin; Jon M. Melvin, West Pittston, all of Pa.

[73] Assignee: Schott Glass Technologies, Inc., Duryea, Pa.

[21] Appl. No.: 361,199

[22] Filed: Jun. 5, 1989

[51] Int. Cl.$^5$ ............................. G02B 1/00; G02B 6/16
[52] U.S. Cl. ................................. 350/96.34; 350/96.27; 501/37
[58] Field of Search ............... 350/96.34, 96.27, 96.30; 501/35, 37

[56] References Cited

U.S. PATENT DOCUMENTS 3,503,764  3/1970  Young ..................... 350/96.34 X
4,367,012  1/1983  Ikeda et al. ............... 350/96.34

Primary Examiner—John D. Lee
Attorney, Agent, or Firm—Millen, White & Zelano

[57] ABSTRACT

Glass fiber cores having a glass composition:

| Compositional Oxide | Range in wt % |
|---|---|
| $SiO_2$ | 25–35 |
| BaO | 6–15 |
| $K_2O$ | 1–6 |
| $Na_2O$ | 0–4 |
| $La_2O_3$ | 0–10 |
| $Nb_2O_5$ | 4–12 |
| PbO | 10–50 |
| $TiO_2$ | 0–4. |

18 Claims, 1 Drawing Sheet

FIBER OPTIC CORE GLASS COMPOSITIONS HAVING A HIGH REFRACTIVE INDEX

BACKGROUND OF THE INVENTION

This invention relates to glass compositions, typically niobium and lead containing, having properties which render the compositions useful in fiber optic faceplate applications, e.g, as electro-optical image tubes, fiber optic image inverters, fiber optic couplers, high efficiency, high contrast rear projection screens, and image couplers for various solid state arrays, field flatteners, image converters, and tapers.

A fiber optic faceplate is an optical mosaic in which fibers are fused together to form a vacuum-tight glass plate. Such a glass plate is effectively equivalent to a zero-thickness window since the image formed on the inside surface of a vacuum enclosure is transported to the external surface with a minimum loss of light. Because of this basic function, fiber-optic faceplates are frequently used to replace ordinary glass viewing areas in vacuum tube envelopes. They can also be used to advantage for field flattening, distortion correction, ambient light suppression and control of angular distribution. Common applications include image intensifiers, storage tubes, and special orthicon and vidiocon tubes.

Many fiber optic glass compositions are known. See, e.g., U.S. Pat. Nos. 3,460,954; 3,503,764; 3,513,004; 3,616,766; 3,650,780; 4,099,834; and 4,194,807. Several of these patents disclose that the composition should be substantially free of lead. See, e.g., U.S. Pat. Nos. 3,460,954; 3,503,764 and 3,616,766.

A need has remained to further the development of fiber optic glasses, e.g., to improve the properties for advanced applications such as fiber optic faceplates.

SUMMARY OF THE INVENTION

It has now been discovered that niobium- and lead-containing glasses suitable for use in fiber optics, especially in fiber optic faceplate applications, and having a very desirable combination of properties can be achieved.

Thus, in one aspect, this invention relates to a glass, useful inter alia as a fiber optic core which can be used in combination with a cladding glass.

The fiber optic core glass of this invention has a coefficient of thermal expansion of, e.g., $70-95 \times 10^{-7}/K$. When used in a composite [e.g., core, clad glass and, optionally, extra mural absorption (EMA)] to be contacted with a metallic surface, e.g., a metal frame, the coefficient of thermal expansion must be compatible with the particular metal used. Since typical metal frame coefficients of thermal expansion may be in the range of $87-90 \times 10^{-7}/K$, this is a major advantage of this invention.

The refractive index, $n_d$, of the core glass is high, e.g., 1.77-1.81. This high refractive index permits, when used as an optical fiber (i.e., combination of core and cladding), a numerical aperture of approximately I or greater when used with conventional cladding glasses. It is contemplated, however, that with the use of a cladding glass having a higher refractive index, numerical apertures of less than 1 can also be obtained. Its softening point can vary within a broad range and will depend on the cladding glass used. Preferably, it will be selected in the range of 620°-700° C. so that the fibers are drawable together with traditional cladding glass using, e.g., the rod-in-tube method.

These glass compositions are also drawable into fibers, are conventional tank-meltable, have good chemical durability, and a have a low raw material batch cost. The glasses according to this invention consist essentially of:

| Oxide | Range in wt % | Preferred Range in wt % |
| --- | --- | --- |
| $SiO_2$ | 25-35 | 25-30 |
| BaO | 6-15 | 10-15 |
| $K_2O$ | 1-6 | 1-4 |
| $Na_2O$ | 0-4 | 0.5-2 |
| $La_2O_3$ | 0-10 | 3-8 |
| $Nb_2O_5$ | 4-12 | 4-8 |
| PbO | 10-50 | 20-50 |
| $TiO_2$ | 0-4 | 0.5-3 |

In another aspect of this invention, the glasses are used as a core in conjunction with a cladding glass to form a fiber optic glass composite.

In yet another aspect of this invention the glasses are used in the manufacture of fiber optic faceplates for various applications.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawing in which like reference characters designate the same or similar parts throughout the several views, and wherein.

DETAILED DESCRIPTION OF THE INVENTION

Figure 1:
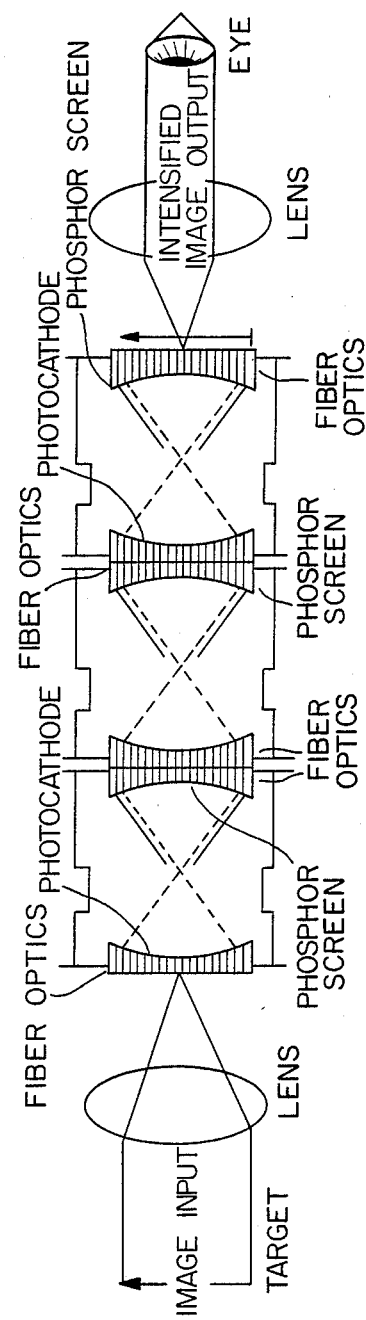
FIG. 1 shows a nonlimiting structure of a conventional fiber optic faceplate application.

The compositions of this invention are compatible with current melting technology, thus assuring that the glasses of this invention will be produced with excellent optical and inclusion qualities.

Silica should be present in an amount of 25-35% by weight. If a silica content above 35% is used, the viscosity of the glass becomes less desirable; e.g., the softening point and the $T_g$ become too high. The coefficient of thermal expansion increases with decreasing amounts of $SiO_2$. Typical end points of the $SiO_2$ range include 25, 26, 27, 28, 29, 30, 31, 32, 33, 34, or 35%.

BaO should be present in an amount of 6-15% by weight. The presence of BaO results in an increase in the refractive index. Typical end points of the BaO range include 6, 7, 8, 9, 10, 11, 12, 13, 14, or 15%. Strontium magnesium and calcium can be used in place of all or part of the barium. However, as is conventional, in order to achieve the desired refraction index, other components in the composition can routinely be varied.

$La_2O_3$ is used in an amount of 0-10% by weight. The use of $La_2O_3$ also results in an increase in the refractive index. Increasing amounts of $La_2O_3$ also results in an increase in the softening point and a decrease in the coefficient of thermal expansion. Typical end points of the $La_2O_3$ include 0, 1, 2, 3, 4, 5, 6, 7, 8, 9, or 10%.

$Nb_2O_5$ should be present in an amount of 4-12% by weight. The presence of $Nb_2O_5$ also increases the refractive index. Increasing the amount of $Nb_2O_5$ tends to lower the coefficient of thermal expansion. The amount of $Nb_2O_5$ should be kept as low as possible while still retaining the desired properties of the glass composition. Typical end points of the $Nb_2O_5$ include 4, 5, 6, 7, 8, 9, 10, 11, or 12%.

$TiO_2$ is very effective in increasing the refractive index. Suitable amounts are between 0 and 4% by weight. However, the amount of $TiO_2$ should be kept low because of a devitrification tendency and because of the adverse effect of excess amounts of $TiO_2$ on transmission in the UV region. $TiO_2$ contents also cause the coefficient of thermal expansion to be lowered. Typical end points of the $TiO_2$ include 0, 1, 2, 3, or 4%.

The amount of $Na_2O$ is 0–4% by weight. A small increase in $Na_2O$ results in a large increase in the coefficient of thermal expansion. The softening point decreases with increasing amounts of $Na_2O$. Typical end points of the $Na_2O$ include 0, 1, 2, 3, or 4%.

The amount of $K_2O$ is in the range of 1–6% by weight. The presence of $K_2O$ affects the coefficient of thermal expansion even more than $Na_2O$ but has a somewhat lesser effect on lowering of the refractive index. $K_2O$ will also decrease the softening point. Typical end points of the $K_2O$ include 1, 2, 3, 4, 5, or 6%.

PbO should be present in an amount of 10–50% by Weight. The presence of PbO increases the refractive index, increases the coefficient of thermal expansion and lowers the softening point. Typical end points of the PbO include 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50%.

Small amounts of other components may be present, e.g., $ZrO_2$ in amounts of 0–2%, ZnO in amounts of 0–3%, and $Al_2O_3$ in amounts of, e.g., 0–3%. Refining agents, such as $As_2O_3$ and $Sb_2O_3$, preferably $As_2O_3$, can be present in amounts of, e.g., 0–1% by weight.

In another aspect of this invention, a fiber optic composite, e.g., core, cladding and, optionally, EMA, is provided. The glass compositions of this invention may be used in conjunction with any fiber-optic cladding glass which is suitable for the intended application. Suitable nonlimiting, nonrestrictive fiber-optic cladding glasses include borosilicate cladding glasses, e.g., those sold under the trade name 8250 Schott, which have the following properties: Coefficient of Thermal Expansion in $K^{-1}(\times 10^{-7})$ (20°–300° C.) of 50; $n_d$ of 1.487; Softening Point in ° C. of 715; Tg in ° C. of 492, or those sold under the trade name EN-1 Kimble, which has the following properties: coefficient of thermal expansion in $K^{-1}(\times 10^{-7})(20°–300°$ C.) of 46.7; an $n_d$ of 1.48; a softening point in ° C. of 718; a Tg in ° C. of 467. Another suitable cladding glass is sold under the trade name of Corning 7052. The glass has a coefficient of thermal expansion at 20°–300° of $46 \times 10^{-7}$, an $n_d$ of 1.484; a softening point in ° C. of 712.

The cladding glass may be applied to the core class by any known method in the art, e.g., draw fusion, fusion, extrusion, chemical vapor deposition, etc.

The area occupied by the cladding glass in a cross-sectional array of fused optical fibers of this invention can vary within a large range, e.g., 8 to 50%, preferably 8 to 30%. EMA is optionally present in an amount of up to 3%.

In yet another aspect of this invention, the fiber optic composite of this invention, e.g., core, cladding and, optionally, EMA combinations, is used in the manufacture of fiber optic faceplates.

Fiber optic faceplates are often used as end windows for various forms of electro-optical image tubes. For this purpose, they should be vacuum-tight and compatible with tube manufacturing requirements. They preferably are thermally compatible with tube envelope materials so that they can be hermetically sealed to the tubes, and chemically compatible with the phosphors which are to be deposited thereon. These plates are used in the manufacture of e.g., electro-optical image tubes; image converters; fiber optic image inverters; fiber optic couplers; high efficient, high contrast rear projection screens; and image couplers for various solid state arrays and field flatteners; charged coupled devices, and tapers. Fiber optic plates can be made by methods known in the art, e.g., by fusing together large numbers of fibers into a solid block which can then be sliced and surfaced into single plates.

The fiber optic glasses of this invention are preferably used in applications in which the glass does not come into contact with a photocathode. Such applications, include but are not limited to the manufacture of a fiber optic anode of an image inverter tube; the output plate of a fiber optic image inverter and the fiber optic anode plate of a charge coupled device, etc.

When used as a fiber optic faceplate, the numerical aperture of the faceplate of this invention is approximately 1 or higher. The faceplates typically have thicknesses, e.g., of 0.5 to 1 inch.

The faceplates of this invention can be used with any compatible phosphors, and are particularly useful when used in conjunction with green phosphor, e.g., P43.

Faceplates can have dimensions which vary in a large range, e.g., those cut from a cross-section $15 \times 6$, preferably $12 \times 5$, more preferably $9 \times 2$ inches. In many applications, the faceplate is cylindrical and has a height of approximately 0.5 to 1 inch, and a diameter of approximately 0.5 to 1 inch in diameter. A nonlimiting example of the application of the faceplates of this invention is in image intensifier tubes used in night vision devices. A diagram of such a device is shown in FIG. 1. The plates serve both to compensate the inevitable field curvature of the electrostatic lenses and to efficiently couple the three separate tube modules together. Each module contains an input plate and an output plate, on one of which is deposited the photocathode and the other, the phosphor. The glass of this invention can be used as the intermediate plates and those on which the phosphor is deposited (e.g., any plate which does not contain the photocathode). The intensifiers have effective diameters of, e.g., 20 mm to 40 mm. Fiber optic technology and glass plates are discussed in, e.g., Siegmund, Fiber Optics, Principles, Properties and Design Considerations, Massachusetts; Technical Memorandum: Fiber Optics: Theory and Applications, Galileo Electro Optics Corp., Massachusetts; Schott Fiber Optics, Inc.: Faceplates, Inverters, Couplers, and Tapers; and Technical Information: Fiber Optic Faceplates, Incom Corporation, Massachusetts.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application are hereby incorporated by reference.

EXAMPLES

Examples 1–7 were melted in a platinum crucible. Examples 8–13 were melted in a quartz crucible.

| Compositional Oxide | Range in wt % |
| --- | --- |
| $SiO_2$ | 25–35 |
| BaO | 6–15 |
| $K_2O$ | 1–6 |
| $Na_2O$ | 0–4 |
| $La_2O_3$ | 0–10 |
| $Nb_2O_5$ | 4–12 |
| PbO | 10–50 |
| $TiO_2$ | 0–4. |

TABLE 1

| Melt No. | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Oxide | (Values in wt. %) | | | | | | | | | | | | |
| $SiO_2$ | 29.0 | 29.0 | 28.0 | 28.0 | 28.0 | 28.0 | 27.0 | 28.0 | 28.94 | 29.18 | 28.0 | 28.0 | 29.0 |
| BaO/N | 12.7 | 13.0 | 13.0 | 13.0 | 13.0 | 17.0 | 13.0 | 12.7 | 12.54 | 13.03 | 12.7 | 12.7 | 16.0 |
| $La_2O_3$ | 5.4 | 4.0 | 4.0 | 3.5 | 4.0 | — | 5.0 | 5.4 | 5.16 | 6.31 | 5.4 | 4.9 | 13.0 |
| $Nb_2O_5$ | 4.4 | 5.0 | 5.0 | 5.0 | 6.0 | 6.0 | 5.0 | 4.4 | 4.21 | 5.14 | 4.4 | 4.4 | 15.0 |
| $TiO_2$ | 1.0 | 1.5 | 1.5 | 2.0 | 1.0 | 1.0 | 1.0 | 1.0 | — | 1.21 | 2.0 | 3.0 | 3.0 |
| $Na_2O$/N | 0.5 | — | — | — | 2.0 | — | 1.0 | 0.5 | 0.47 | 0.63 | 0.5 | — | 2.0 |
| $K_2O$/C | 1.0 | 1.5 | 2.5 | 2.5 | — | 2.0 | 2.0 | 1.0 | 0.90 | 1.11 | — | — | 2.0 |
| PbO | 46.0 | 46.0 | 46.0 | 46.0 | 46.0 | 46.0 | 46.0 | 47.0 | 46.78 | 43.39 | 47.0 | 47.0 | 20.0 |
| Property | Value | | | | | | | | | | | | |
| Tg (transformation temp., in °C. | 542 | 555 | 538 | 542 | 519 | 539 | 518 | 532 | 545 | 544 | 558 | 581 | 628 |
| C.T.E. $\times 10^{-7}$/°C. (0–400) | 83.9 | 81.0 | 87.8 | 86.2 | 88.4 | 87.0 | 94.5 | 84.5 | 80.6 | 80.9 | 77.7 | 73.6 | 78.3 |
| (softening point) n = $10^{7.6}$, in °C. | 687.9 | 696.5 | 682.2 | 682.9 | 662.8 | 683.2 | 660.1 | 681.8 | 693.3 | 704.5 | 700.1 | 714.3 | 778.9 |
| (density) ρ | 4.731 | 4.728 | 4.721 | 4.713 | 4.774 | 4.730 | 4.791 | 4.822 | 4.693 | 4.638 | 4.796 | 4.823 | 4.205 |
| $n_d$ | 1.77801 | 1.78425 | 1.78410 | 1.78706 | 1.79068 | 1.78085 | 1.79024 | 1.78904 | 1.77076 | 1.76982 | 1.79243 | 1.80435 | 1.76988 |
| $v_d$ | 29.34 | — | — | — | — | — | — | 29.26 | 29.61 | 30.05 | 28.65 | 27.82 | |
| $n_D$ | — | 1.78399 | 1.78381 | 1.78685 | 1.79046 | 1.78044 | 1.79001 | 1.78879 | 1.77048 | 1.76949 | 1.79212 | 1.80412 | 1.77011 |
| $n_e$ | | 1.79085 | 1.79169 | 1.79372 | 1.79729 | 1.78907 | | 1.79556 | 1.77681 | 1.77587 | 1.79881 | 1.81138 | 1.77610 |
| $T_i$ at 544 mm (25 mm) | | 0.947 | 0.970 | 0.985 | 0.967 | 0.927 | | 0.970 | 0.978 | 0.976 | 0.974 | 0.987 | 0.960 |

A devitrification test was performed on Test Melt 1 to determine the stability of the glass. The test was performed using platinum strips in a gradient furnace at 1000° C. for 30 minutes.

The results are set forth below.

| | |
| --- | --- |
| 1. Bulk devitrification (°C.): | None |
| 2. Surface devitrification range (°C.): | 737–1000 |
| 3. Surface devitrification Max. (°C.): | 955 |
| 4. Surface crystal growth rate at max. (82 m/min): | 2.8 |
| 5. Pt/Glass interface devitrification (°C.): | None |

The above test melt results show that there is no substantial bulk crystallization and, therefore, this glass can be easily processed in conventional tank melting and fiber optic drawing operations.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A glass fiber comprising a core glass and a cladding glass applied thereon, wherein the core glass consists essentially of:

2. A fiber optic core glass fiber according to claim 1, wherein $SiO_2$ is present in an amount of 25–30%; and lead is present in amount of 20–50%.

3. A glass fiber according to claim 1, wherein BaO is present in an amount of 10–15%.

4. A glass fiber according to claim 1, wherein PbO is present in an amount of 40–50% by weight.

5. A glass fiber according to claim 1, having a core composition with the following properties: Coefficient of Thermal Expansion at 0°–400° C.: 70–95×10$^{-7}$ 1/K; $n_d$ of 1.77–1.81 and softening point of 620°–700° C.

6. A glass fiber according to claim 1, wherein the cladding glass has the following properties: Coefficient of Thermal Expansion in K$^{-1}$ (×10$^{-7}$): 40–55; $n_d$ of 1.45–1.50; softening point of 700°–720° C.; Tg of 400°–500° C.

7. A glass fiber according to claim 1, having a numerical aperture of 1 or greater.

8. A glass fiber according to claim 1, having a numerical aperture of less than 1.

9. In an electro-optical image tube comprising a fiber optic cathode, a fiber optic anode, and a micro channel plate, the improvement wherein the fiber optic anode comprises a glass fiber of claim 1.

10. In a fiber optic wafer tube, comprising a fiber optic cathode and fiber optic image inverter, the improvement wherein the fiber optic image inverter comprises a glass fiber of claim 1.

11. In a fiber optic faceplate, the improvement wherein the faceplate comprises a glass fiber of claim 1.

12. A faceplate according to claim 11, having a thickness of 0.5 to 1 inch.

13. A faceplate according to claim 12, having a numerical aperture of 1 or greater.

14. A faceplate according to claim 13, wherein said faceplate has green phosphor attached thereto.

15. A faceplate according to claim 11, having a numerical aperture of less than 1.

16. A fiber optic according to claim 1, further comprising $Al_2O_3$, ZnO, or $ZrO_2$.

17. A fiber optic according to claim 1, further comprising $Sb_2O_3$ or $As_2O_3$.

18. An optical mosaic comprising glass fibers having a core glass and a cladding glass wherein the core glass has the following composition:

| Compositional Oxide | Range in wt % |
| --- | --- |
| $SiO_2$ | 25–35 |
| BaO | 6–15 |
| $K_2O$ | 1–6 |
| $Na_2O$ | 0–4 |
| $La_2O_3$ | 0–10 |
| $Nb_2O_5$ | 4–12 |
| PbO | 10–50 |
| $TiO_2$ | 0–4. |

* * * * *